Aug. 4, 1942.  F. F. OLSON ET AL  2,291,832
COATING METHOD AND APPARATUS
Filed Aug. 3, 1940  3 Sheets-Sheet 1
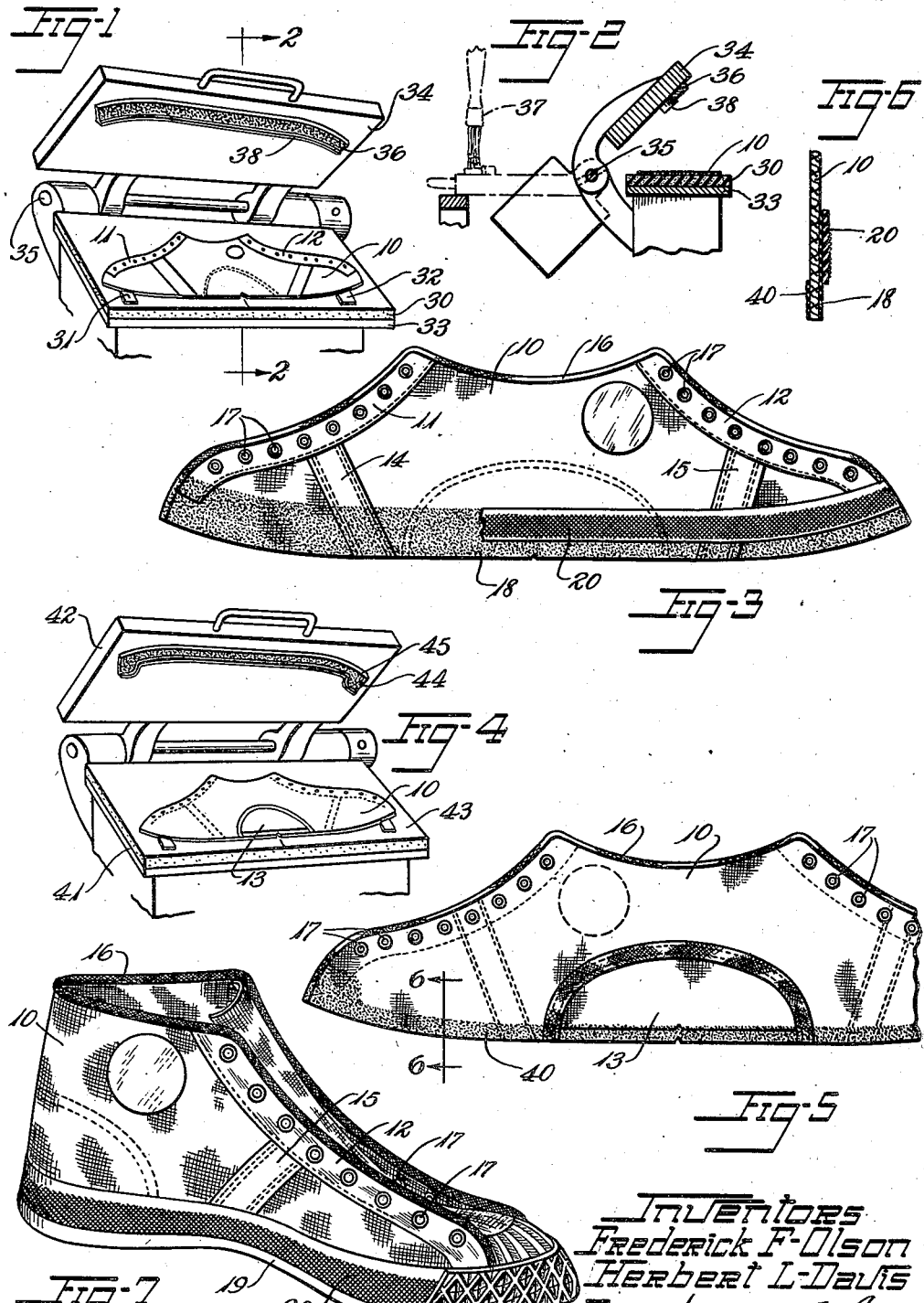

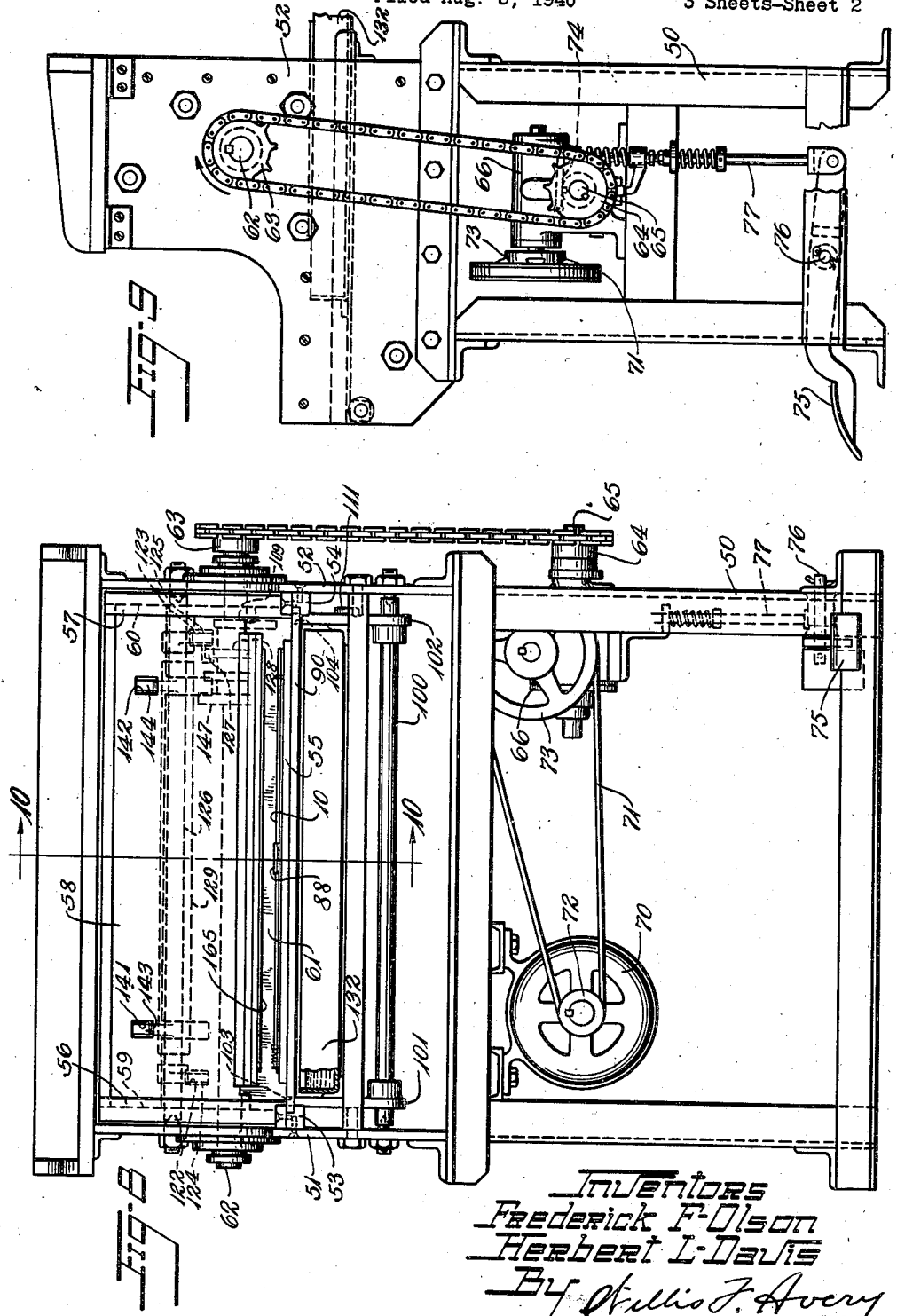

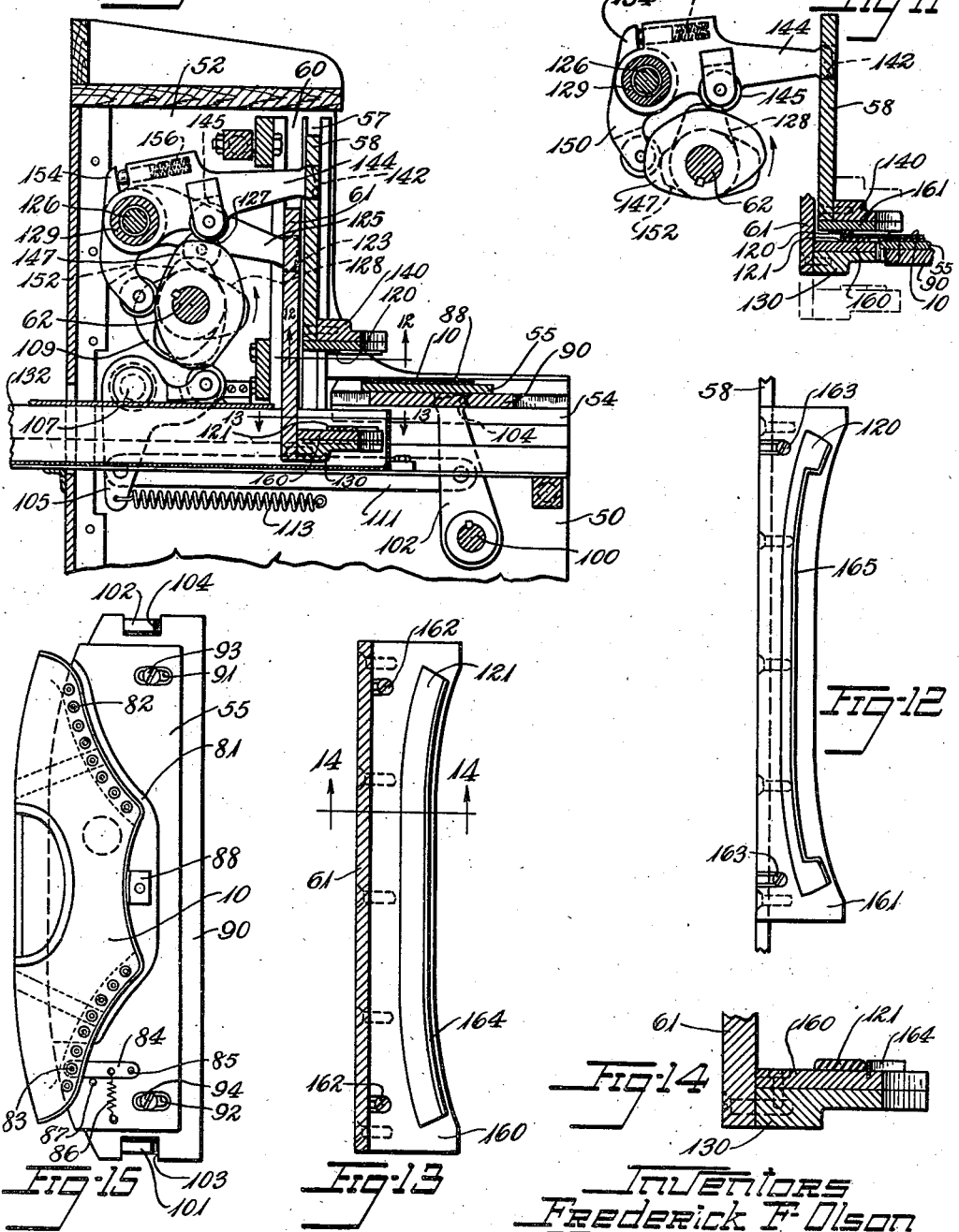

Patented Aug. 4, 1942

2,291,832

UNITED STATES PATENT OFFICE 2,291,832

COATING METHOD AND APPARATUS

Frederick F. Olson, Belmont, and Herbert L. Davis, Walpole, Mass., assignors to The B. F. Goodrich Company, New York, N. Y., a corporation of New York Application August 3, 1940, Serial No. 350,616

5 Claims. (Cl. 12—80)

This invention relates to coating methods and apparatus, and is especially useful in applying cement and in the manufacture of footwear having fabric uppers and in cementing similar parts.

In the manufacture of footwear having fabric uppers it is desirable to cement the edges of the upper to the insole and outsole. This requires application of cement directly to the margins of the canvas or other fabric uppers. Heretofore it has been customary to apply the cement to the upper while the upper was supported on the last, an operation which has been difficult to perform and one which has necessitated waiting for the cement to dry on the last. Where cement has been applied to the uppers by hand great difficulty has been experienced in keeping the upper free from cement where such cement is unnecessary. As the upper is made up of overlying pieces of material, uniform application of cement over the stepped area has also been difficult because of the unevenness.

The present invention aims to provide an improved procedure and improved apparatus for overcoming these difficulties.

The principal objects of the invention are to provide for coating or cementing the article in flat condition, to provide a neat application despite unevenness of the footwear part or other article, to provide a uniform coating of cement to the article, to provide for simultaneous cementing of both sides of the upper, to protect the uncemented part of the article, and to provide for application of gum strips thereto.

These and other objects will appear from the following description and the accompanying drawings.

Of the drawings:

Fig. 1 is a perspective view of a cement printing apparatus of simple form for applying cement to the outside of an upper and illustrating the method of the invention.

Fig. 2 is a cross-section on line 2—2 of Fig. 1 showing in dot-and-dash lines the application of cement thereto.

Fig. 3 is a plan view of the outside of a fabric upper with the cement and foxing applied thereto, part of the foxing being broken away.

Fig. 4 is a view like Fig. 1 showing another cement printing apparatus for applying cement to the inside of the upper.

Fig. 5 is a plan view of the inside of the upper with the cement coating thereon.

Fig. 6 is a sectional detail view of the upper, taken on line 6—6 of Fig. 5.

Fig. 7 is a perspective view of a finished shoe.

Fig. 8 is a front elevation of the apparatus in its preferred form.

Fig. 9 is an end elevation thereof.

Fig. 10 is a cross-sectional view taken on line 10—10 of Fig. 8, parts being broken away.

Fig. 11 is a detail view of the operating mechanism for controlling the movements of the printing blocks.

Fig. 12 is a face view of the upper adhesive applying member as viewed on line 12—12 of Fig. 10.

Fig. 13 is a face view of the lower adhesive applying member, partly taken in section on line 13—13 of Fig. 10.

Fig. 14 is a detail sectional view of the lower adhesive applying member, taken on line 14—14 of Fig. 13.

Fig. 15 is a plan view of the work-carrying platen with a shoe upper thereon.

The invention contemplates the printing of a cement coating upon the faces of an uneven flexible article such as a fabric footwear part, at its margin while the article is in flat condition, and the simultaneous application of cement to both sides of the article. That part of the article where no cement is wanted is protected by means for preventing spread of the cement. Foxing strips or similar reinforcements are also applied to the article while the cemented article is in flat condition.

Referring to the drawings, the shoe upper used to illustrate the method comprises a vamp and quarters 10 of fabric material such as a canvas outer layer and a fabric lining adhered face to face by a layer of rubber material. Reinforcements, such as eyelet stays 11, 12, counter reinforcement 13, stays 14, 15, and edge binding 16 providing additional thickness over certain areas are attached to the upper before the upper is cemented, and eyelets 17 may also be affixed thereto.

A coating 18 of cement is applied along the lower margin of the upper on its outer surface for the purpose of securing the outsole 19 and the foxing 20 of rubber-like material thereto. This coating is applied while the upper is in flat condition and to provide for uniform application of the cement over the desired area without deposit of cement where not desired, the upper may be laid on a resilient pad 30 of sponge rubber and located thereon by stops 31, 32. The pad 30 may be supported on a platen 33 having a second platen 34 hinged thereto, as at 35. A printing block 36 having the shape and size of the desired cement deposit is removably mounted on the platen 34 and is preferably formed of sponge rubber. The printing block 36 may be charged with cement either by removing it and dipping it in a dispersion of rubber-like material or by applying such material thereto by means of a brush 37 or other implement. When placed on the platen 34 it registers with the upper 10 and by swinging the platen 34 on its hinge, the block contacts the upper and applies a coating of cement thereto in the proper position. To provide against travel of the cement coating beyond the desired area, a dam 38 of stiff impervious material, such as a strip of metal, is fixed along the margin of the printing block and projects from the platen 34 at least as high as, and preferably slightly higher than the printing block so as to contact with the upper along the line of the desired cement coating in advance of contact of the printing block with the upper. Due to the resilient nature of the pad 30, the upper is pressed against the dam strip irrespective of its uneven thickness due to the added reinforcements, thereby sealing the surface of the upper against spread of the cement coating. At the same time, the resilient nature of the pad 30 and the resilient nature of the printing block 36 provide uniform application of cement irrespective of uneven thickness of the upper at various zones along the cemented area.

After the upper has been cemented on its outer surface, a foxing 20 of the rubber-like material in strip form may be laid over the cemented area and rolled in place while the upper is in flat condition.

Before or after the foxing 20 is applied, the opposite side of the upper may be printed with a cement coating 40 in similar manner by use of hinged platens 41, 42, a resilient pad 43 of sponge rubber, a resilient printing block 44 and a dam 45, as illustrated in Fig. 4. The printing block and dam may be of different shape from that previously used depending upon the shape and size of the area to be cemented.

While a shoe upper has been used to illustrate the method, the invention is not limited to such use, as many other shoe parts and other articles of flexible material may be cemented in similar fashion. By the provision of other mechanism, as illustrated in Figs. 8 to 15, both sides of the upper may be coated simultaneously thereby reducing the time of the operations.

Referring to the drawings, the numeral 50 designates a supporting frame of the apparatus which supports a pair of spaced frame members 51, 52 of generally L-shape. Between these members are horizontal guideways 53, 54 along which a carriage 90, which supports a platen 55, is slideably mounted, and vertical guideways 56, 57 for a vertical carriage 58, and vertical guideways 59, 60, parallel thereto, for a second carriage 61. A cam shaft 62 is rotatably mounted in the plates for the purpose of operating the carriages and has a sprocket 63 fixed thereto whereby it may be driven from a sprocket 64 fixed to the shaft 65 of a speed reducer 66, of the worm geared type, mounted on the frame 50. The speed reducer is driven by an electric motor 70, also mounted on the frame 50, through a belt 71 and pulleys 72, 73 mounted on the motor and speed reducer shafts respectively, the arrangement being such that the cam shaft is driven from the motor at a constant speed. A clutch 74 of the punch press type may be provided between the speed reducer and the sprocket 64 and may be engaged by a foot pedal 75 pivoted to the frame, as at 76 and connected to a clutch operating rod 77, the arrangement being such that when the clutch is depressed the cam shaft 62 revolves through a single revolution and stops. The sprockets 63 and 64 are also of equal size so that the cam shaft 62 makes one revolution each time the pedal 75 is depressed momentarily and released.

The work-supporting platen 55 is best illustrated in Fig. 15. Its forward margin is shaped to correspond closely to the shape of the margin of the upper so as to support it as close to the area to be cemented as possible. The platen has a pad 81 of resilient cushion material, such as sponge rubber, to support the upper 10. For centering the upper, a fixed pin 82 is mounted on the platen in a position to enter one of the eyelets at one end of the upper, and a second locating pin 83, adapted to enter an eyelet at the opposite end of the upper, is mounted on a swinging arm 84 pivoted on a pin 85, fixed to the platen. A coil spring 86 has one end fixed to the platen and the other end fixed to the arm 84 and urges the arm in a direction to tension the upper between the two named eyelets, and a stop pin 87. A stop 88 mounted on the platen engages the edge of the upper. The arrangement is such that the upper may be placed with its edge against the stop 88 and one eyelet over the pin 82 and the other eyelet may then be placed over the pin 83 which tensions the upper slightly.

Preferably the platen 55 is adjustably mounted on the supporting carriage 90 so as to be removable therefrom for replacement by similar platens of different shape, and to regulate the width of the cemented area. The platen is provided with slots 91, 92 through which retaining screws 93, 94 pass to adjustably secure it to the carriage.

For imparting a forward and backward motion to the platen, a shaft 100 is horizontally supported and rotatably mounted between the frame members 51, 52, and a pair of arms 101, 102 fixed thereto extend upwardly and enter clearance slots 103, 104 in the carriage for driving it. A bell-crank arm 105 is pivotally mounted on frame member 52 by a stud 107. A horizontally extending arm of the bell-crank engages cam 109 on cam shaft 62 and is oscillated thereby. Link 111 pivotally connects the vertical arm of bell-crank 105 to arm 102. Coil spring 113, holds the bell-crank arm in engagement with the cam 109. The arrangement is such that at each revolution of the cam shaft 62, the platen 55 is advanced to printing position and after dwelling for the time required for printing, is returned to its original position.

Printing of cement on opposite sides of the upper is accomplished by printing blocks 120, 121 mounted on slides 58 and 61 respectively. Cam mechanism is provided for manipulating the slides and is as follows:

Slide 61 is formed with a pair of slots 122, 123. A pair of arms 124, 125 are secured to a horizontal shaft 126 rotatably supported between frame members 51, 52, and their ends engage in said slots. Arm 125 has a roller 127 which rides on a cam 128 on shaft 62 adapted to lift the slide. The lower printing block 121 is adjustably mounted on a shelf 130 of the slide and is normally submerged in a tank 132 of adhesive material. The cam 128 is so formed that the block remains in the tank until platen 55 has been moved by its cam to the forward position, whereupon the block 121 is raised from the cement into contact with the work, and is then lowered to its normal position.

The upper printing block is adjustably mounted on a shelf 140 of slide 58 (see Fig. 11). Slide 58 has slots 141, 142 which are engaged by the ends of arms 143, 144 secured to a sleeve 129 pivotally mounted on shaft 126. Arm 144 has a roller 145 adapted to ride a cam 147, fixed to shaft 62. Cam 147 is adapted to raise the slide 58 from a normal position where the printing block is submerged in the tank 132 to a position above the work to be cemented and is so formed as to raise the printing block to such elevated position in advance of the forward movement of the work-supporting platen 55 and later to permit the slide to descend to a position where the printing block 120 contacts with the work, and thereafter to raise it again before the platen 55 starts its rearward movement, and then to permit its being lowered to the starting position.

To provide for resiliently forcing the upper printing block against the work, an arm 150 is pivotally mounted on sleeve 129, adjacent the arm 144. Arm 150 engages a driving cam 152 fixed to shaft 62 and cooperating therewith. Arm 150 has a finger 154 adapted to compress a coil spring 156 between it and the arm 144 to force the printing block 120 against the work in a downward direction at the same time that the printing block 121 is pressed upwardly. The spring 156 compensates for variation of thickness of the work, especially when nonresilient printing blocks are employed, and prevents breaking of the cam arm. The printing blocks 120, 121 are also preferably made of resilient material such as sponge rubber or soft vulcanized rubber-like material to compensate for differences in thickness of the article.

For adjusting the printing blocks, each block is mounted on a plate 160, 161 adjustably and removably secured to its shelf to which it is fixed by screws 162, 163 passing through slots in the plate. Dams 164, 165 of strip material are provided at the margins of the printing blocks to confine the deposited cement and to prevent undue spreading of the resilient printing blocks under pressure as in the simple apparatus heretofore described. The operation of the apparatus just described is as follows:

The article to be cemented, such as a canvas shoe upper is placed by the operator in proper position on the work-supporting platen. The operator then depresses the treadle and the cam shaft 62 rotates through a single operation and then stops. During this rotation of the shaft, the upper printing block 120 is raised from the bath of cement to a position higher than the article (as shown in Fig. 10), the platen carrying the article moves to its advanced position between the printing blocks and stops. The upper printing blocks is now lowered into contact with the article and simultaneously the lower printing block is raised from the cement bath into contact with the work. The work is then squeezed between the blocks forcing cement into the fabric, the impervious metal dams preventing spread of the cement to other areas. The printing blocks separate and the platen withdraws the work to its initial position. Just before the work reaches its final position, the upper printing block is lowered into the cement bath. The article is then removed from the platen.

As the printing blocks are normally immersed in the cement bath, drying of cement thereon and injury to the blocks is prevented.

Variations may be made without departing from the invention as it is defined by the following claims.

We claim:

1. Apparatus for simultaneously coating portions of opposite sides of a flexible article, said apparatus comprising a movable platen for supporting an article, means thereon for retaining the article thereon in flat condition with portions of the article exposed, a pair of printing members movable toward and away from each other, means for loading the printing members with adhesive, means for moving the platen to a position where the article is advanced between said printing members, and means for advancing said printing members simultaneously against opposite sides of the article.

2. Apparatus for simultaneously coating portions of opposite sides of a flexible article, said apparatus comprising a movable platen for supporting an article, means thereon for locating the article in flattened stretched condition and retaining the article thereon with portions of the article exposed, a pair of printing members movable toward and away from each other, means for loading the printing members with adhesive, means for moving the platen to a position where the article is advanced between said printing members, and means for advancing said printing members simultaneously against opposite sides of the article.

3. Apparatus for simultaneously coating portions of opposite sides of a flexible article, said apparatus comprising a movable platen for supporting the article, locating members thereon adapted to engage in apertures of the article to retain the article on the platen with portions of the article exposed, a pair of printing members movable toward and away from each other, said printing members having marginal guards for confining adhesive, means for loading the printing members with adhesive, means for moving the platen to a position where the article is advanced between said printing members, and means for advancing said printing members simultaneously against opposite sides of the article.

4. Apparatus for simultaneously coating portions of opposite sides of a flexible article, said apparatus comprising a container for adhesive, a platen for supporting an article above said container and movable horizontally thereof, means on said platen for retaining an article in flattened condition with portions of both sides of the article exposed, a pair of printing members movable vertically toward and away from each other, means for lowering both printing members into said container to charge them with adhesive, means for raising the upper printing member from the adhesive to separate the printing members, means for advancing the platen to position the exposed portions of said article between said printing members, means for advancing said printing members toward and from each other to deposit adhesive on opposite sides of said article simultaneously, and means for withdrawing said platen from between said printing members.

5. The method of coating opposite sides of a flexible article which comprises supporting said article in flattened condition with portions of its sides exposed, loading a pair of printing members with adhesive material, advancing the flattened article between the printing members, advancing said printing members simultaneously against opposite sides of the exposed article, and withdrawing said members from the article in opposite directions to release the article and thus leaving the adhesive material on the opposite sides of the article.

FREDERICK F. OLSON.
HERBERT L. DAVIS.